United States Patent [19]
Gooding

[11] 3,882,254
[45] May 6, 1975

[54] PEANUT BUTTER

[75] Inventor: Chester Martin Gooding, Westfield, N.J.

[73] Assignee: CPC International Inc., Englewood Cliffs, N.J.

[22] Filed: Oct. 31, 1973

[21] Appl. No.: 411,524

[52] U.S. Cl. .................................................. 426/633
[51] Int. Cl. ............................................... A23l 1/38
[58] Field of Search .......... 426/199, 209, 372, 362, 426/363

[56] References Cited
UNITED STATES PATENTS

| | | | |
|---|---|---|---|
| 1,395,934 | 11/1921 | Stockton | 426/199 X |
| 2,079,288 | 5/1937 | Hoffman | 426/363 |
| 2,911,303 | 11/1959 | Rowland et al. | 426/199 |
| 2,928,745 | 3/1960 | Roylance | 426/362 |
| 3,044,883 | 7/1962 | Ferguson, Jr. | 426/209 X |
| 3,129,102 | 4/1964 | Sanders | 426/199 |
| 3,216,830 | 11/1965 | Melnick | 426/199 X |
| 3,580,729 | 5/1971 | Darragn et al. | 426/372 X |
| 3,594,184 | 7/1971 | Hawley et al. | 426/199 X |
| 3,619,207 | 11/1971 | Dzurik et al. | 426/199 |
| 3,671,267 | 6/1972 | Gooding et al. | 426/209 |

Primary Examiner—Frank W. Lutter
Assistant Examiner—Steven L. Weinstein
Attorney, Agent, or Firm—Salvotore C. Mitri

[57] ABSTRACT

A peanut butter composition having improved spreadability, improved melt down in the mouth, and resistance to oil bleeding and gravitational separation is prepared from peanut butter and a non-hydrogenated hard fraction separated from palm oil.

2 Claims, No Drawings

PEANUT BUTTER

This invention relates to a stabilizer for peanut butter to provide peanut butter of improved mouth feel, low temperature spreadability, and resistance to oil bleeding and gravitational separation.

Peanut butter of the prior art consists essentially of ground roasted peanuts, sugar (dextrose and/or sucrose), and salt. Because this product exhibits gravitational instability (oil layer separating on top of the product) it has become regular practice to add relatively high melting fat components to the hot (about 170°F) peanut butter prior to filling the product into jars. This high melting fat component usually has a melting point in excess of 110°F, about less than 160°F, and may be: a partially hydrogenated fat, a completely hydrogenated fat, monoglyceride and diglyceride esters of saturated fatty acids, or mixtures of these stabilizing agents.

These high melting fat components, when added in small amounts, (viz., 1 to 3 percent of the peanut butter), may be introduced as a supplement to the ground roasted peanuts or when added in larger amounts (viz., 5 to 10 percent of the peanut butter), may be introduced after an equivalent amount of liquid peanut oil in the ground roasted peanuts has been removed. The added hard fat is believed to form a continuous or semi-continuous structure within the final peanut butter during the cooling of the product and in so doing prevents oil from separating from the peanut butter. The sugar and salt flavorings are added in the peanut butter manufacture in total amounts usually less than 5 percent and this addition may be balanced if desired with an equivalent addition by weight of liquid non-hydrogenated vegetable oil or the stabilizing agent previously mentioned. During the roasting of the peanuts, the moisture content is reduced so that the final product will contain less than 4 percent moisture.

Oil separation can easily be prevented by the use of a sufficient amount of a completely saturated fat or other stabilizers. This, however, leads to a sacrifice of low temperature spreadability and the development of waxy mouthing properties. The delicate balance required to prevent oil separation without sacrificing too much temperature spreadability and incurring too waxy mouthing properties is difficult to attain and almost impossible to maintain in the day-to-day manufacture of peanut butter.

The well known determination of solids content index (SCI) applied to the extracted fat from heated peanut butters provides a good method for correlating the spreadability and stability of peanut butters with the amounts and kinds of stabilizers used in the peanut butters. The SCI of the fat may be determined by the dilatometric method described by Fulton et al (JAOCS 31, 98, 1954). The less solids the fat contains at 50°F, the more spreadable is the peanut butter. On the other hand, there must still be a sufficient solid fat content at 100°F if oil separation is to be avoided. Thus, the higher the SCI values at about 100°F, the better is the tendency of the peanut butter containing the oils to resist oil separation.

The so-called, "old-fashioned" peanut butter which is simply ground, roasted peanuts enjoys a preferential acceptance by those who desire peanut butter without the added hydrogenated fats which are commonly employed to inhibit separation of peanut oil. The separated oil, floating on the surface of the remaining hard packed peanut butter, is exposed to oxidative deterioration and it is desirable to prevent such separation.

It is an object of this invention to provide a peanut butter stabilized against oil separation at ambient temperatures.

It is another object to provide a stabilized peanut butter of improved spreadability without incurring the susceptability to oil separation.

I have discovered that an unhydrogenated fraction of palm oil is capable of immobilizing the oil phase of peanut butter without undue "drag" in the mouth. This property is very likely related to the composition and structure of the glycerides contained in the hard fraction of palm oil which, itself, is high melting but not so high melting as the hydrogenated and partially hydrogenated fats heretofore employed in the art. Furthermore, the hard fraction of palm oil contains a significant amount of polyunsaturated acids, in fact, as much as 3 to 5 times the amount usually present in butter fat and as much as twice the amount usually present in cocoa butter. Thus, while the hard fraction of palm oil is the hard or high melting fat, it owes its high melting point to the peculiar glyceride structure of that fraction of palm oil rather than to the presence of large amounts of stearic acid or hydrogenated fat stabilizers used in the prior art which, incidentally, contain no or insignificant amounts of polyunsaturated acids.

The following table illustrates the effect of my new peanut butter stabilizer, solids content of the liquid oil phase peanut butter as contrasted with solids contributed by hydrogenated fats. It is to be understood that the concentrations used in the table are those obtained in the liquid phase of peanut butter, normally of about 50 percent peanut oil. Thus, concentrations in a whole peanut butter would be ½ of those shown in Table I.

Table I

| Test 1 | 50°F | 70°F | 80°F | SCI Values 92°F | 102°F | 106°F | 110°F |
|---|---|---|---|---|---|---|---|
| Peanut Oil - 95% Saturated Peanut Oil Stabilizer - 5% Wiley Melting Point of Mixture - 118.4°F | 6.9 | 5.8 | 6.0 | 6.3 | 5.5 | 4.9 | 4.6 |
| Test 2 | | | | | | | |
| Peanut Oil - 97% Saturated Peanut Oil - 3% Wiley Melting Point of Mixture - 112.3°F | 4.7 | 3.4 | 3.7 | 3.7 | 2.9 | 2.5 | 2.3 |
| Test 3 | | | | | | | |
| Peanut Oil - 97% Saturated Palm Oil - 3% Wiley Melting Point of Mixture - 101.8°F | 4.4 | 3.1 | 3.1 | 3.1 | 1.7 | 0.9 | 0.5 |

Table I — Continued

| Test 1 | 50°F | 70°F | 80°F | SCI Values 92°F | 102°F | 106°F | 110°F |
|---|---|---|---|---|---|---|---|
| Test 4 | | | | | | | |
| Peanut Oil - 93.5%<br>Hard Fraction from<br>Palm Oil - 6.5%<br>Wiley Melting Point<br>of Mixture - 97.0°F | 4.7 | 3.4 | 3.2 | 2.8 | 1.6 | 0.0 | 0.0 |
| Test 5 | | | | | | | |
| Peanut Oil - 94%<br>Hard Fraction from<br>Randomized Soft<br>Fraction of Test 4 - 6%<br>Wiley Melting Point<br>of Mixture - 97.5°F | 4.8 | 3.6 | 3.4 | 3.1 | 1.3 | 0.0 | 0.0 |

Tests 1 and 2 clearly show how solids still appear at 102°, 106° and 110°. The presence of these solids results in a slow melting, pasty feel in the mouth.

Test 3 illustrates a degree of improvement in that solids tend to disappear at the higher temperatures. This improvement is likely due to the relatively high palmitic acid content of hydrogenated palm oil and the effect is probably augmented by the distribution of the saturated acids in the glycerides of completely hydrogenated palm oil. Thus, hydrogenated palm oil would be a very useful stabilizer for peanut butter were it not for its complete lack of polyunsaturated acids as the result of its having been hydrogenated.

Tests 4 and 5 illustrate that the solids content of peanut oil solutions of unhydrogenated fractions of palm oil compare favorably with those of saturated peanut oil solutions at 50°, 70° and 80°F. However, as the temperature approaches body temperature, the solids of these solutions rapidly decrease. This behavior probably accounts for the improved mouth feel of peanut butter stabilized with unhydrogenated hard fractions of palm oil. These effects are likely attributable to the structure and composition of the triglycerides of palm oil's hard fraction and in turn to a rapidly increased solubility of these triglycerides in peanut oil at the higher temperatures. Likewise, upon cooling, residual crystal memory results in a re-gelling and immobilization of the peanut oil of the peanut butter after exposure to melting temperatures.

The unhydrogenated hard fractions of palm oil utilized in this invention are easily prepared simply by allowing whole, refined and bleached palm oil to partially crystallize while slowly stirring at temperatures between about 85°F - 105°F or even as high as 108°F. The simplicity of separation of the partially crystallized palm oil by filtration provides an abundant source of stabilizer. At the same time the process yields a soft or liquid fraction of palm oil suitable for many edible uses. In fact, the soft fraction is more useful for many such applications than is whole palm oil. Other more elaborate procedures for removing the higher melting fractions of palm oil are known and practiced.

EXAMPLE 1

800 lbs. of refined and bleached palm oil was partially crystallized with slow stirring for 45 hours at 95°F. Filtration through a filter press with air-blowing of the filter cake produced 12.8 percent of hard fraction having the following characteristics.

Melting Point 130.8°F, Iodine Value 32.6

| | | SCI Values | | |
|---|---|---|---|---|
| 50°F | 70°F | 80°F | 92°F | 102°F |
| 90.9 | 80.7 | 78.5 | 77.9 | 75.1 |

| | | Fatty Acid Composition % | | | |
|---|---|---|---|---|---|
| Myristic C14 | Palmitic C16 | Stearic C18 | Oleic C18:1 | Linoleic C18:2 | Linolenic C18:3 |
| 1.4 | 65.8 | 5.3 | 21.4 | 5.7 | 0.3 |

EXAMPLE 2

The filtrate of Example 1 was used to prepare a second crop of hard fraction through randomization by ester interchange. The randomized filtrate was partially crystallized after the manner in which the first crop of hard fraction was obtained from the whole palm oil in Example 1.

| | | Melting Point °F | Iodine Value | SCI Values | | | | |
|---|---|---|---|---|---|---|---|---|
| | | | | 50°F | 70°F | 80°F | 92°F | 102°F |
| (a) | Filtrate before randomization | 86.4 | 57.1 | 27.6 | 7.2 | 2.3 | 0.0 | 0.0 |
| (b) | Filtrate after randomization | 108.1 | 56.7 | 17.9 | 10.3 | 11.0 | 9.3 | 7.7 |
| (c) | Filtrate from crystallized, randomized (b) | 86.2 | 62.8 | 20.5 | 8.2 | 3.2 | 0.1 | 0.1 |
| (d) | Hard Fraction from randomized, crystallized (b) yield 18.7% | 129.2 | 30.1 | 61.8 | 61.2 | 61.7 | 60.5 | 56.5 |

Peanut butter was prepared in which the sole stabilizer was the hard fraction obtained from whole refined and bleached palm oil. Preliminary exploration of SCI values contributed by the hard fraction in peanut oil solutions indicated that 3.4 percent of the stabilizer in peanut butter would provide the desired degree of stabilization. This concentration corresponds to 6.8 percent in the peanut oil solutions of the pilot exploration.

oil separated by filtration should possess SCI values at 80°F of 2.0 to 3.0 and preferably 2.4 to 2.7. A 92°F solids should correspond to SCI values of 1.5 to 2.6 and preferably 1.9 to 2.3.

EXAMPLE 3

|  | Melting Point °F | Iodine Value | SCI | | | | |
|---|---|---|---|---|---|---|---|
|  |  |  | 50°F | 70°F | 80°F | 92°F | 102°F |
| Unhydrogenated Hard Fraction from Palm Oil | 134.1 | 30.4 | 56.9 | 52.6 | 53.6 | 56.0 | 58.0 |
| Oil Separated from Melted Peanut Butter Stabilized With 3.4% of Above Hard Fraction | — | — | 4.7 | 2.4 | 2.7 | 2.0 | 0.4 |

Many other examples could be given in which varying amounts of unhydrogenated hard fractions derived from palm oil were used to produce stabilized peanut butter of improved mouth feel and of improved spreadability. Those skilled in the art will appreciate that the hard fractions derived from palm oil will not all be identical in physical properties. The latter will vary due to the fact that palm oils, being products of nature, will evidence small differences in compositions and that the characteristics of the hard fractions derived therefrom will reflect variations of the temperature and time allowed for crystallization. Furthermore, the amount of soft fraction retained in the filter cake will vary with the conditions of filtration, how well blown is the filter cake or to what pressure the filter cake is subjected during separation. However, no matter how these factors affect the character of the derived hard fraction, a simple exploration of SCI values of solutions of the hard fraction in peanut oil will serve as a guide to how much should be used in the peanut butter to be stabilized. After a few such tests one soon learns to relate characteristics of the hard fraction, (melting point and iodine value) to what may be expected of a particular hard fraction from palm oil as a stabilizer for peanut butter without the necessity of actual preliminary testing for SCI values of peanut oil solutions. In general, when peanut butters of this invention are melted, the While the invention has been described in connection with specific embodiments thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and fall within the scope of the invention.

I claim:

1. A peanut butter composition having improved spreadability, improved melt down in the mouth and resistance to oil bleeding and gravitational separation comprising peanut butter and a non-hydrogenated refined and bleached hard fraction separated from palm oil in an amount sufficient to provide an SCI value in solution with peanut oil of from about 2.0 to about 3.0 at 80°F and from about 1.5 to 2.5 at 92°F.

2. The peanut butter as set forth in claim 1 which contains a sufficient amount of the non-hydrogenated hard fraction separated from palm oil to give an SCI value in solution with peanut oil of from about 2.4 to 2.7 at 80°F and from about 1.9 to 2.3 at 92°F.

* * * * *